(12) United States Patent
Aso (10) Patent No.: US 11,407,043 B2
(45) Date of Patent: Aug. 9, 2022

(54) CUTTING INSERT

(71) Applicant: TUNGALOY CORPORATION, Fukushima (JP)

(72) Inventor: Takahiro Aso, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 50 days.

(21) Appl. No.: 17/080,116

(22) Filed: Oct. 26, 2020

(65) Prior Publication Data
US 2021/0178497 A1 Jun. 17, 2021

(30) Foreign Application Priority Data
Dec. 13, 2019 (JP) .............................. JP2019-225550

(51) Int. Cl.
*B23C 5/20* (2006.01)
(52) U.S. Cl.
CPC .................................. *B23C 5/202* (2013.01)
(58) Field of Classification Search
CPC ...... B23C 2200/0427; B23C 2200/208; B23C 2200/286; B23C 5/06; B23C 5/207; B23C 5/202; B23C 2210/16; B23C 2210/168
See application file for complete search history.

(56) References Cited

U.S. PATENT DOCUMENTS 6,050,751 A * 4/2000 Hellstrom ........... B23B 27/1622
407/103
6,543,970 B1 * 4/2003 Qvarth .................... B23C 5/202
407/115

(Continued)

FOREIGN PATENT DOCUMENTS

EP 3388227 A1 * 10/2018 ................ B22F 3/03
JP H09-174323 A 7/1997
(Continued)

*Primary Examiner* — Nicole N Ramos
(74) *Attorney, Agent, or Firm* — Studebaker & Brackett PC (57) ABSTRACT

Provided is a cutting insert, within which a burr being generated at an outer edge of a finished surface is inhibited and chipping of the cutting insert is inhibited even when the cutting insert is formed to have multiple corners superior in economical efficiency. The cutting insert has an upper surface, a lower surface on an opposite side to the upper surface, and a circumferential side surface connecting the upper surface and the lower surface to each other. A first ridgeline at which the upper surface and the circumferential side surface intersect each other includes major cutting edges and wiper cutting edges which are alternately disposed one by one, and corners each disposed between each of the major cutting edges and each of the wiper cutting edges. A distance between the corners that are adjacent to each other is equal to or less than 60% of a diameter of an inscribed circle of the first ridgeline. The corner that is positioned at one end of the wiper cutting edge is formed at a deburring cutting edge that intersects the wiper cutting edge at an angle smaller than an angle formed by the major cutting edge and the wiper cutting edge. The corner that is positioned at the other end of the wiper cutting edge is formed at a corner cutting edge having a curvature larger than that of the wiper cutting edge.

2 Claims, 7 Drawing Sheets

(56) References Cited

U.S. PATENT DOCUMENTS

| | | | | |
|---|---|---|---|---|
| 7,802,944 B2 * | 9/2010 | Engstrom | ............. | B23C 5/2247 |
| | | | | 407/66 |
| 8,430,607 B2 * | 4/2013 | Jansson | ................... | B23C 5/06 |
| | | | | 407/103 |
| 2003/0039519 A1 * | 2/2003 | Scherbarth | .............. | B23C 5/202 |
| | | | | 407/113 |
| 2007/0160431 A1 * | 7/2007 | Pantzar | ................. | B23C 5/2213 |
| | | | | 407/67 |
| 2008/0304924 A1 * | 12/2008 | Engstrom | ............... | B23C 5/202 |
| | | | | 407/35 |
| 2016/0288224 A1 | 10/2016 | Ishi et al. | | |
| 2017/0120351 A1 * | 5/2017 | Fang | ........................ | B23C 5/06 |
| 2017/0225243 A1 | 8/2017 | Matsumura et al. | | |

FOREIGN PATENT DOCUMENTS

| | | | | | |
|---|---|---|---|---|---|
| JP | 2001025907 A | * | 1/2001 | | |
| JP | 2017071056 A | * | 4/2017 | ............. | B23C 5/06 |
| WO | WO-0066305 A1 | * | 11/2000 | ............. | B23C 5/202 |
| WO | 2009/096516 A1 | | 8/2009 | | |
| WO | 2015/076216 A1 | | 5/2015 | | |
| WO | 2015/147220 A1 | | 10/2015 | | |

\* cited by examiner

CUTTING INSERT

CROSS-REFERENCES TO RELATED APPLICATIONS

This application relates to and claims priority from Japanese Patent Application No. 2019-225550, filed on Dec. 13, 2019, the entire disclosure of which is incorporated herein by reference.

BACKGROUND

Field

The present invention relates to a cutting insert used for a rotating tool such as a face milling tool.

Description of Related Art

There is a demand for a single cutting insert that has a mixture of multiple types of cutting edges. For example, a single cutting insert, in which a major cutting edge and a wiper cutting edge are mixed, is commercially available as a product. In such a cutting insert, the major cutting edge and the wiper cutting edge which is much smaller than the major cutting edge are disposed side by side in a side defined between adjacent corners.

For example, in milling, burrs are easily generated on an outer edge of work material. A height of a burr changes depending on a height and a width of the work material left uncut. If a width of an uncut portion is the same, the smaller a cutting angle is, the lower a height of the uncut portion becomes, whereby the height of the burr becomes smaller. In order to reduce a height of a burr, there is a demand that a deburring cutting edge, which has a smaller cutting angle than that of a major cutting edge, be added as part of a cutting edge.

For example, a cutting insert mounted on a rotating tool revolves around a rotation center of a tool body serving as an axis. In a traveling direction of the cutting insert, a corner positioned on an outer circumferential side of the tool body precedes a corner positioned on a center side. However, depending on, for instance, bending of the tool body and a processing method, a corner on a subsequent side may process an uncut portion of a preceding edge. When the corner is sharp, the cutting edge is likely to become chipped. There is a demand for a corner cutting edge that is formed to have a corner on a subsequent side rounded with a large curvature.

On the other hand, if an inscribed circle has the same diameter, the greater the number of corners is, the shorter a length of each cutting edge becomes, thus it is difficult to produce a cutting edge having a complex shape in a multi-corner cutting insert, for example, by forming a major cutting edge and a wiper cutting edge side by side between adjacent corners, or further adding a deburring cutting edge or a corner cutting edge. For example, a regular octagonal cutting insert described in WO 2015/076216 has arc-shaped cutting edges formed on the entire circumference thereof. For example, a regular octagonal cutting insert described in WO 2009/096516 has straight cutting edges formed on the entire circumference thereof. While a multi-corner cutting insert exhibits superior economical efficiency, shapes of cutting edges thereof tend to be monotonous.

SUMMARY

Therefore, it is an object of the present invention to provide a cutting insert in which burrs being generated on an outer edge of work material can be inhibited even when multiple corners superior in economical efficiency are formed. Also, it is an object of the present invention to provide a cutting insert in which chipping of a cutting insert can be inhibited.

A cutting insert according to one embodiment has an upper surface, a lower surface on an opposite side to the upper surface, and a circumferential side surface connecting the upper surface and the lower surface to each other. A ridgeline at which the upper surface and the circumferential side surface intersect each other includes major cutting edges and wiper cutting edges which are alternately disposed one by one, and corners each disposed between each of the major cutting edges and each of wiper cutting edges. A distance between the corners that are adjacent to each other is equal to or less than 60% of a diameter of an inscribed circle of the ridgeline. The corner that is positioned at one end of the wiper cutting edge is formed at a deburring cutting edge that intersects the wiper cutting edge at an angle smaller than an angle formed by the major cutting edge and the wiper cutting edge. The corner that is positioned at the other end of the wiper cutting edge is formed at a corner cutting edge having a curvature larger than that of the wiper cutting edge.

According to this aspect, one of the major cutting edge and the wiper cutting edge is formed between adjacent corners. Even when the cutting insert has multiple corners and a space between adjacent corners becomes narrower, it is not necessary to dispose both of them between the corners, and thus the cutting insert has excellent manufacturability. The wiper cutting edge can be formed to have substantially the same length as the major cutting edge. Since there is enough space, the deburring cutting edge and the corner cutting edge can be added. As a result, even with a multi-corner cutting insert which has excellent economical efficiency, it is possible to inhibit burrs generated at an outer edge of a finished surface and chipping of the cutting insert.

In the above aspect, the circumferential side surface may include first side surfaces facing the major cutting edges respectively and second side surfaces facing the wiper cutting edges respectively. Each of the second side surfaces may include an upper step surface which is inclined to be nearer to a central axis of the cutting insert with increasing proximity to the lower surface and which is smoothly continuous with the first side surface, and a lower step surface having a step provided between the lower step surface and the first side surface.

In this aspect, the lower step surface is retracted such that it is closer to the central part of the cutting insert by an amount of the step from the other portions of the circumferential side surface. Since chips generated from the wiper cutting edge are minute, they easily flow between the flank and the finish surface. Since a large space can be secured between the lower step surface and the finished surface, discharging properties for the chips generated from the wiper cutting edge are improved.

In the above aspect, a clearance angle of each of the second side surfaces may be larger than that of each of the first side surfaces.

According to this aspect, the major cutting edge, which is thicker than the wiper cutting edge, is less likely to become chipped. The wiper cutting edge that generates minute chips can secure a larger space between the flank and the finish surface.

In the above aspect, the wiper cutting edges are positioned farther from the central axis of the cutting insert than the major cutting edges are.

According to this aspect, even if the wiper cutting edge is mounted in a tip seat shared by the major cutting edge, the wiper cutting edge protrudes further than the major cutting edge. Since it is not necessary to provide a tip seat for the wiper cutting edge, a tool body shared by other types of cutting insert can be used. Since the wiper cutting edge is a cutting edge for machining the finished surface later than the other types of cutting edge, it desirably performs slightly deeper cutting than the other types of cutting edge. If a distance from the central axis of the cutting insert is the same for the wiper cutting edge and the other types of cutting edges, it is necessary to provide a tip seat for the wiper cutting edge in order to make the wiper cutting edge protrude further than other types of cutting edge.

According to the present invention, it is possible to provide a cutting insert in which burrs being generated at an outer edge of a finished surface can be inhibited and in which chipping of the cutting insert can be inhibited even when the cutting insert is formed to have multiple corners which are excellent in terms of economical efficiency.

DETAILED DESCRIPTION

Preferred embodiments of the present invention will be described with reference to the accompanying drawings. In addition, in each of the drawings, components denoted by the same reference numerals have the same or similar configurations. One feature of a cutting insert 2 according to one embodiment of the present invention is that major cutting edges 51 and wiper cutting edges 53 are alternately disposed one by one, and corners A, B, C, D, E, F, G, and H are formed between the major cutting edges 51 and the wiper cutting edges 53. Only one of the major cutting edge 51 and the wiper cutting edge 53 is disposed between adjacent corners, that is, on each of sides AB, BC, CD, DE, EF, FG, GH, and HA. Thus, there is sufficient space although there are multiple corners and distances between the adjacent corners become narrower. It is possible to form the wiper cutting edge 53 to have substantially the same length as the major cutting edge 51, or add a deburring cutting edge 52 and a corner cutting edge 54. Hereinafter, each constituent will be described in detail with reference to FIGS. 1 to 7.

Figure 1:
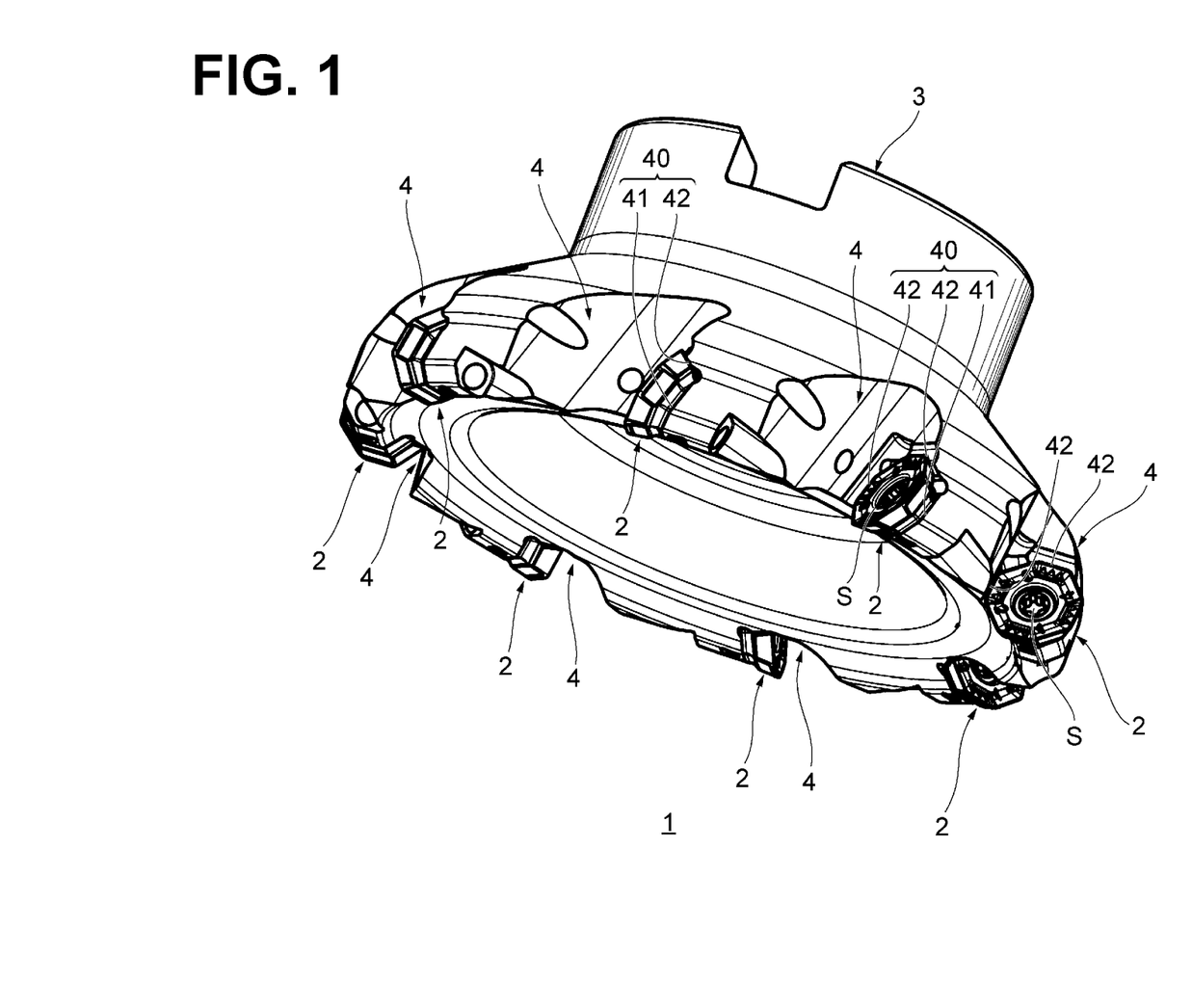
FIG. 1 is a perspective view showing an example of a rotating tool on which a cutting insert according to one embodiment of the present invention is mounted.

FIG. 1 is a perspective view showing an example of a rotating tool 1 on which the cutting insert 2 according to one embodiment of the present invention is mounted. The rotating tool 1 is, for example, a face milling tool, and includes a tool body (a cutter body) 3 formed in a disk shape, and a plurality of cutting inserts 2 mounted on an outer circumferential portion of the tool body 3. The rotating tool 1 is not limited to face milling and may be another type of rotating tool.

As shown in FIG. 1, pockets (recessed portions) 4 are provided on the outer circumferential portion of the tool body 3 at equal intervals. Each of the pockets 4 is provided with a tip seat 40 for mounting the cutting insert 2. The tip seat 40 has a seat surface 41 and a restraining surface 42 standing upright from the seat surface 41. The seat surface 41 abuts a lower surface 6 of the cutting insert 2, which will be described later, and the restraining surface 42 abuts a circumferential side surface 7 of the cutting insert 2, which will be described later. The cutting insert 2 is fixed to the tip seat 40 with a fastening screw S or the like.

The cutting insert 2 according to one embodiment of the present invention is a wiper insert for finishing a finished surface more smoothly. In the illustrated example, the same cutting insert 2 is mounted in each of the pockets 4 for the sake of explanation. However, the cutting insert 2 which is a wiper insert may be mounted in at least one pocket 4, and other types of cutting inserts may be mounted in the remaining pockets 4.

Figure 2:
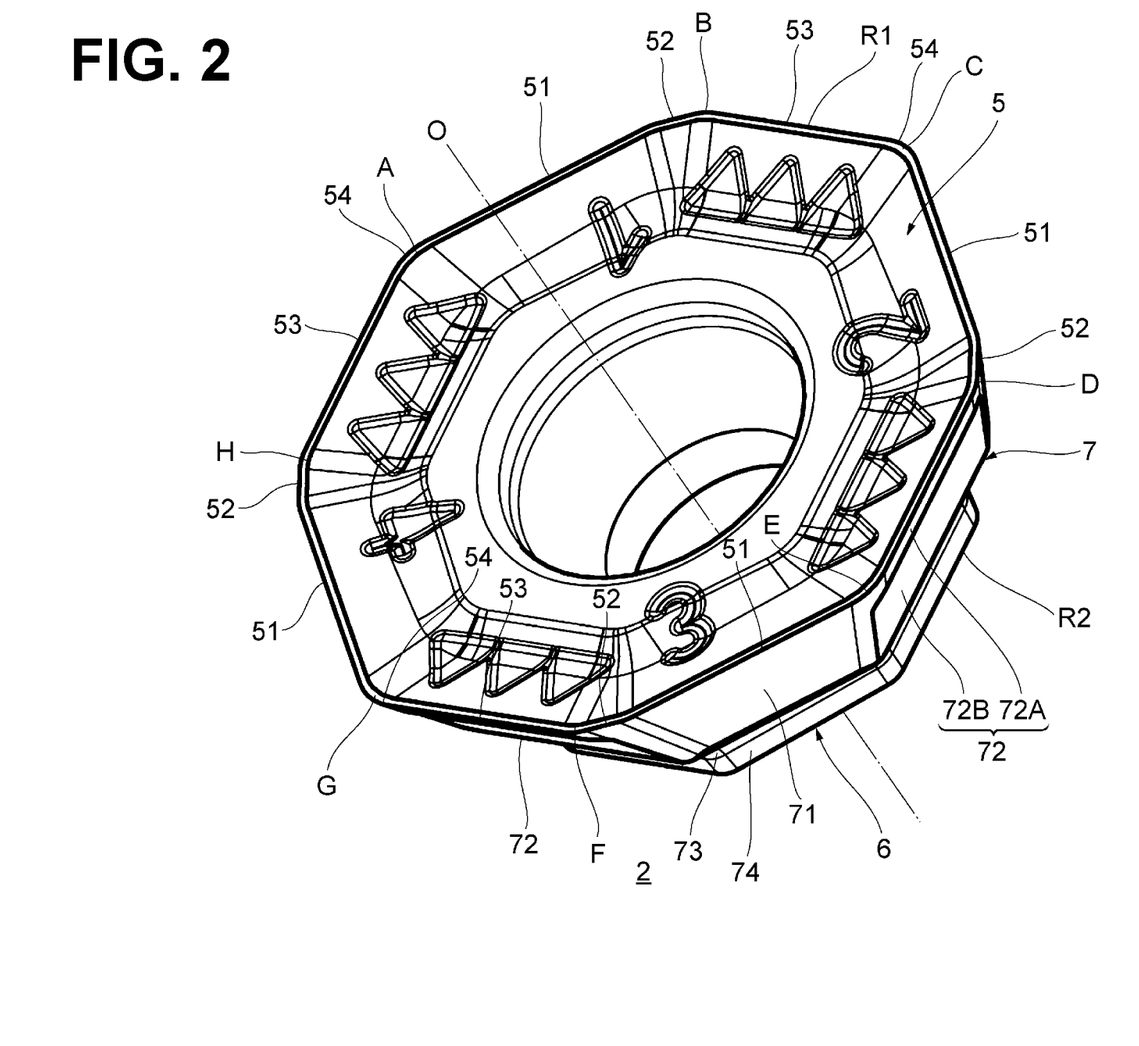
FIG. 2 is a perspective view showing an example of the cutting insert according to one embodiment of the present invention.

FIG. 2 is a perspective view showing an example of the cutting insert 2 according to one embodiment of the present invention. As shown in FIG. 2, the cutting insert 2 has an upper surface 5, a lower surface 6 on a side opposite to the upper surface 5, and a circumferential side surface 7 connecting the upper surface 5 to the lower surface 6, and a screw hole that penetrates the upper surface 5 and the lower surface 6 is formed therein.

The upper surface 5 and the lower surface 6 are rotationally symmetrical about a center of the screw hole (in the illustrated example, 90 degree symmetrical). In the following description, a straight line passing through the center of the screw hole is referred to as a central axis O of the cutting insert 2, a side closer to the central axis O is referred to as a central part of the cutting insert 2, and a side away from the central axis O is referred to as an outer circumferential side of the cutting insert 2.

Figure 3:
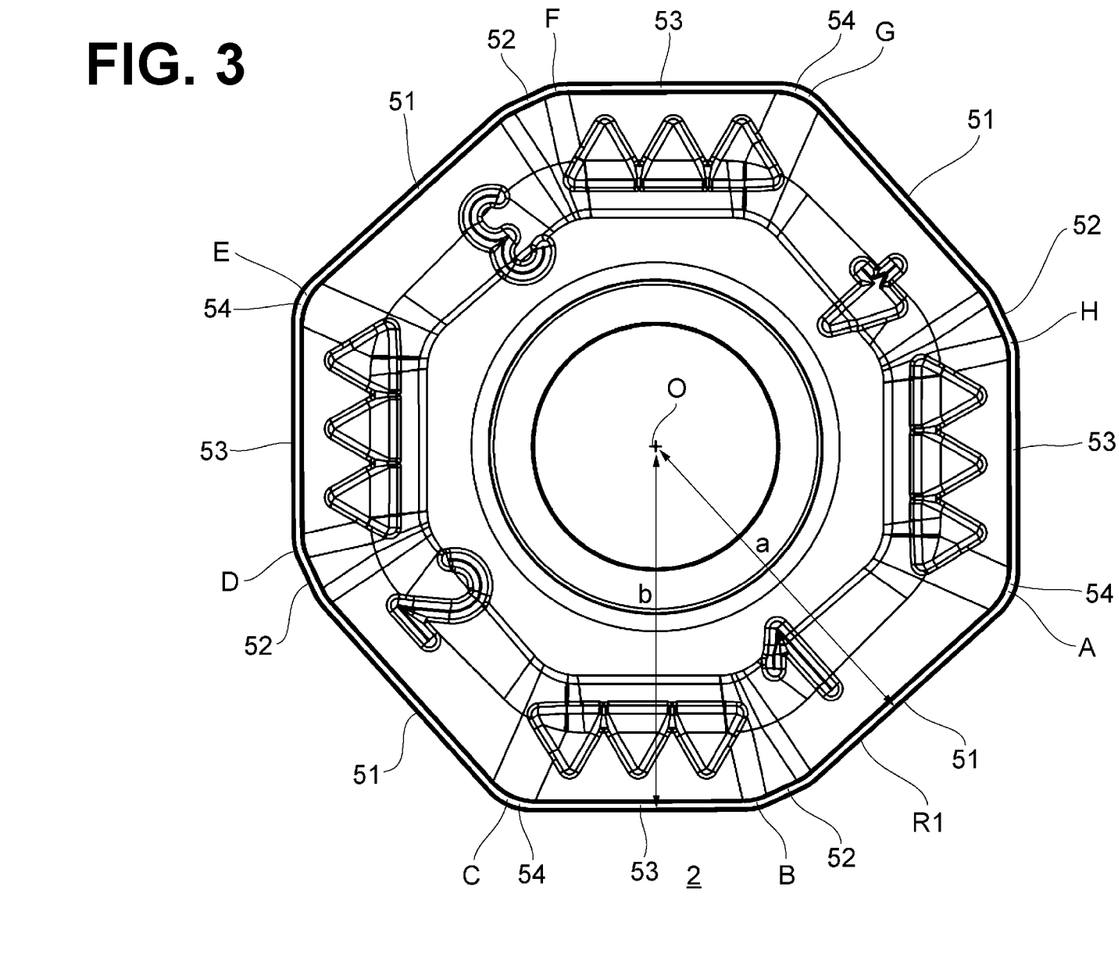
FIG. 3 is a plan view showing an upper surface of the cutting insert shown in FIG. 2.

FIG. 3 is a plan view showing the upper surface 5 of the cutting insert 2 shown in FIG. 2. In the illustrated example, a first ridgeline R1 at which the upper surface 5 and the circumferential side surface 7 intersect is formed in a substantially regular octagonal shape including a plurality of corners A, B, C, D, E, F, G and H disposed at intervals. Also, the shape of the first ridgeline R1 is not limited to the illustrated example and may be hexagonal or decagonal. The shape of the first ridgeline R1 will be described in detail later.

As shown in FIG. 3, the major cutting edges 51 and the wiper cutting edges 53 are alternately disposed one by one between the adjacent corners, that is, on each side AB, BC, CD, DE, EF, FG, GH, and HA. In the illustrated example, a distance b from the central axis O of the cutting insert 2 to the wiper cutting edge 53 is configured to be longer than a distance a from the central axis O of the cutting insert 2 to the major cutting edge 51.

The deburring cutting edge 52 is formed at one end (for example, the corner B) of the wiper cutting edge 53. A corner cutting edge 54 is formed at the other end (for example, the corner C) on a side opposite to the one end. As shown in FIG. 3, one feature of the cutting insert 2 of one embodiment of the present invention is that the wiper cutting edge 53 is formed to have substantially the same length as the major cutting edge 51. One feature thereof is that such a long wiper cutting edge 53 is sandwiched between cutting edges having different shapes (in the illustrated example, the deburring cutting edge 52 and the corner cutting edge 54).

Figure 4:
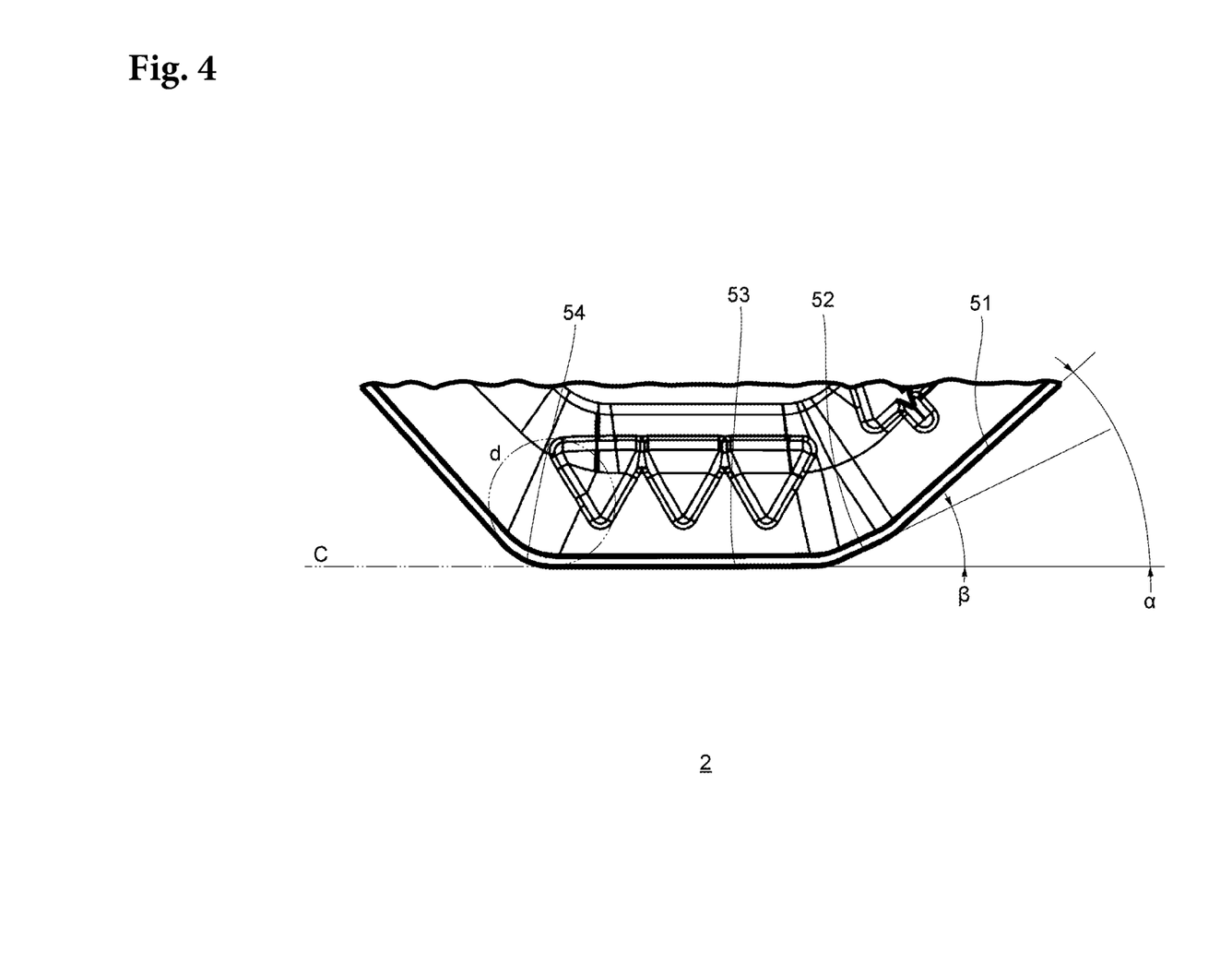
FIG. 4 is an enlarged plan view showing a wiper cutting edge shown in FIG. 3.

FIG. 4 is an enlarged plan view showing the wiper cutting edge 53 shown in FIG. 3. As shown in FIG. 4, the major cutting edge 51 and the deburring cutting edge 52 are formed in linear shapes. The wiper cutting edge 53 and the corner cutting edge 54 are formed in arc shapes. A curvature of the corner cutting edge 54 is larger than a curvature of the wiper cutting edge 53. In the illustrated example, a radius of a circle of curvature c of the wiper cutting edge 53 is 500 mm, and a radius of a circle of curvature d of the corner cutting edge 54 is 1 mm. Since the radius of the circle of curvature c of the wiper cutting edge 53 is large, it can be microscopically approximated as a straight line. An angle β at which the wiper cutting edge 53 and the deburring cutting edge 52 intersect is smaller than an angle α at which the wiper cutting edge 53 and the major cutting edge 51 intersect.

Figure 5:
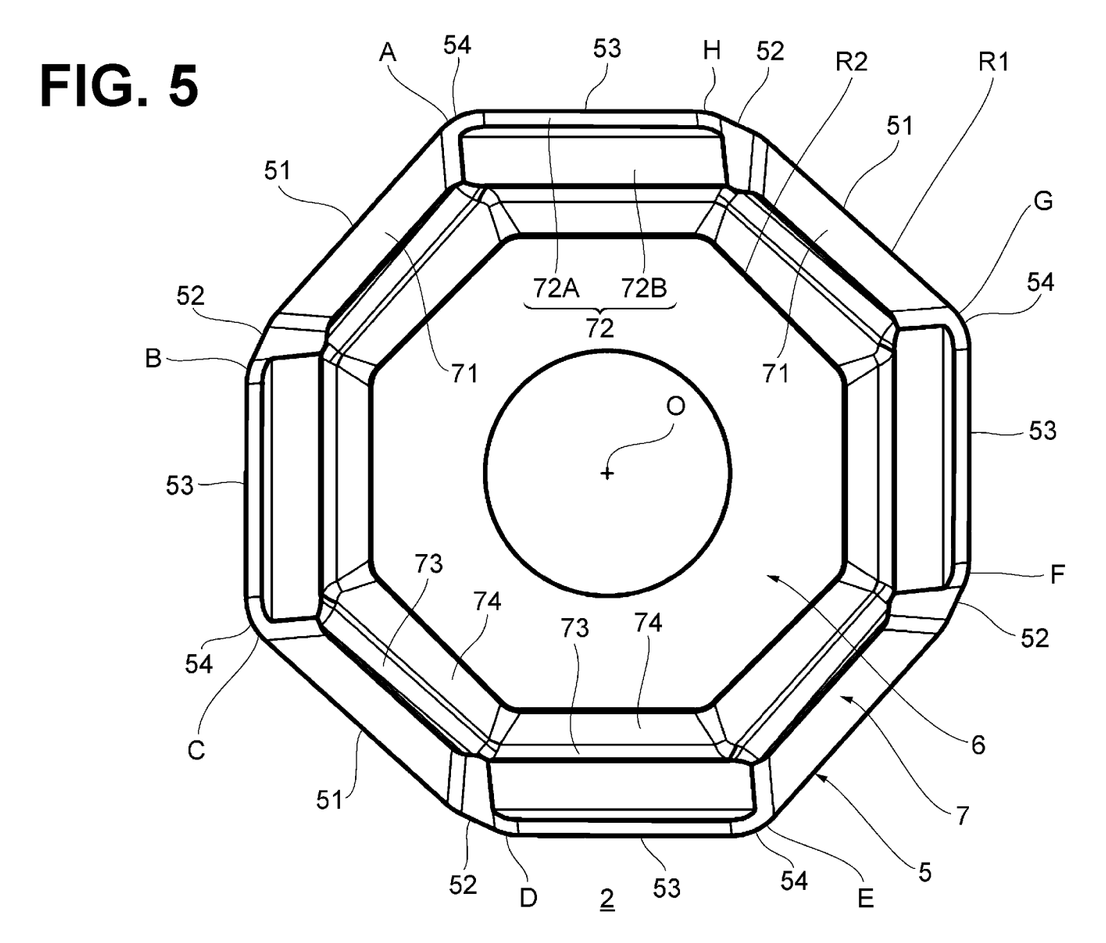
FIG. 5 is a bottom view showing a lower surface of the cutting insert shown in FIG. 2.
Figure 6:
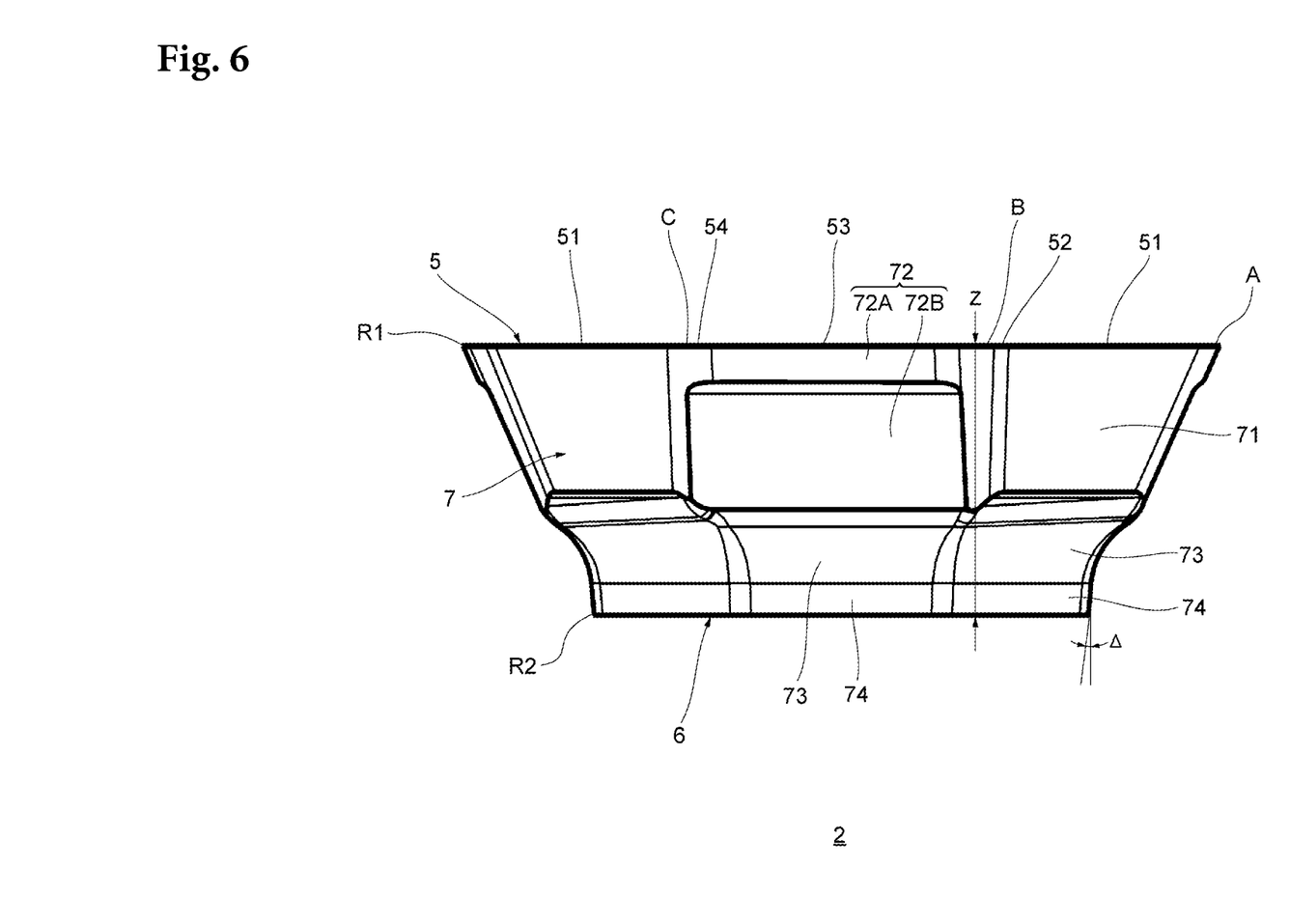
FIG. 6 is a side view showing a circumferential side surface of the cutting insert shown in FIG. 2.

FIG. 5 is a bottom view showing the lower surface 6 of the cutting insert 2 shown in FIG. 2. As shown in FIG. 5, a second ridgeline R2 at which the lower surface 6 and the circumferential side surface 7 intersect is formed in a substantially regular octagonal shape like the first ridgeline R1. FIG. 6 is a side view showing the circumferential side surface 7 of the cutting insert 2 shown in FIG. 2. As shown in FIG. 6, all the corners A, B, C, . . . have the same height Z from the lower surface 6. In the illustrated example, the circumferential side surface 7 includes a first side surface 71, a second side surface 72, a third side surface 73, and a fourth side surface 74.

The first side surface 71 is formed to face the major cutting edge 51. The second side surface 72 is formed to face the wiper cutting edge 53. The second side surface 72 includes an upper step surface 72A and a lower step surface 72B. The upper step surface 72A is smoothly continuous with the first side surface 71. A step is provided between the lower step surface 72B and the first side surface 71, and the lower step surface 72B is formed as a flat surface that is recessed closer to the central part of the cutting insert 2 than the upper step surface 72A. The upper step surface 72A and the upper surface 5 intersect at the first ridgeline R1 described above. The lower step surface 72B is formed to be larger than the upper step surface 72A and abuts the restraining surface 42 of the tool body 3 described above.

The third side surface 73 is formed to face both the first side surface 71 and the second side surface 72 from a side below (a side opposite to the upper surface 5). The third side surface 73 has a strip shape parallel to the upper surface 5 and the lower surface 6 and is formed as a curved surface that is recessed toward the central part of the cutting insert 2. The fourth side surface 74 connects the third side surface 73 to the lower surface 6.

The major cutting edges 51 and the deburring cutting edges 52 are formed on the sides AB, CD, EF, and GH (shown in FIG. 5). On such sides, the first side surface 71, the third side surface 73, and the fourth side surface 74 are arranged in order from the upper surface 5 toward the lower surface 6. The wiper cutting edges 53 and the corner cutting edges 54 are formed on the sides BC, DE, FG, and HA (shown in FIG. 5). On such sides, the second side surface 72, the third side surface 73, and the fourth side surface 74 are arranged in order from the upper surface 5 toward the lower surface 6.

The first side surface 71 and the second side surface 72 are inclined such that they come closer to the central axis O of the cutting insert 2 as they near the lower surface 6. That is, clearance angles of the first side surface 71 and the second side surface 72 are positive. The clearance angle γ of the second side surface 72 is formed to be larger than the clearance angle of the first side surface 71. Since the clearance angle is large, a large space can be secured between the second side surface 72 and the finished surface, chips generated by the wiper cutting edge 53 can be discharged smoothly.

An angle A at which the fourth side surface 74 is inclined with respect to the central axis O of the cutting insert 2 is formed smaller than the clearance angle γ of the second side surface 72. If the inclination angle A of the fourth side surface 74 is small, the second ridgeline R2 that is a contour of the lower surface 6 becomes clear, and thus the cutting insert 2 can be easily attached thereto.

Figure 7:
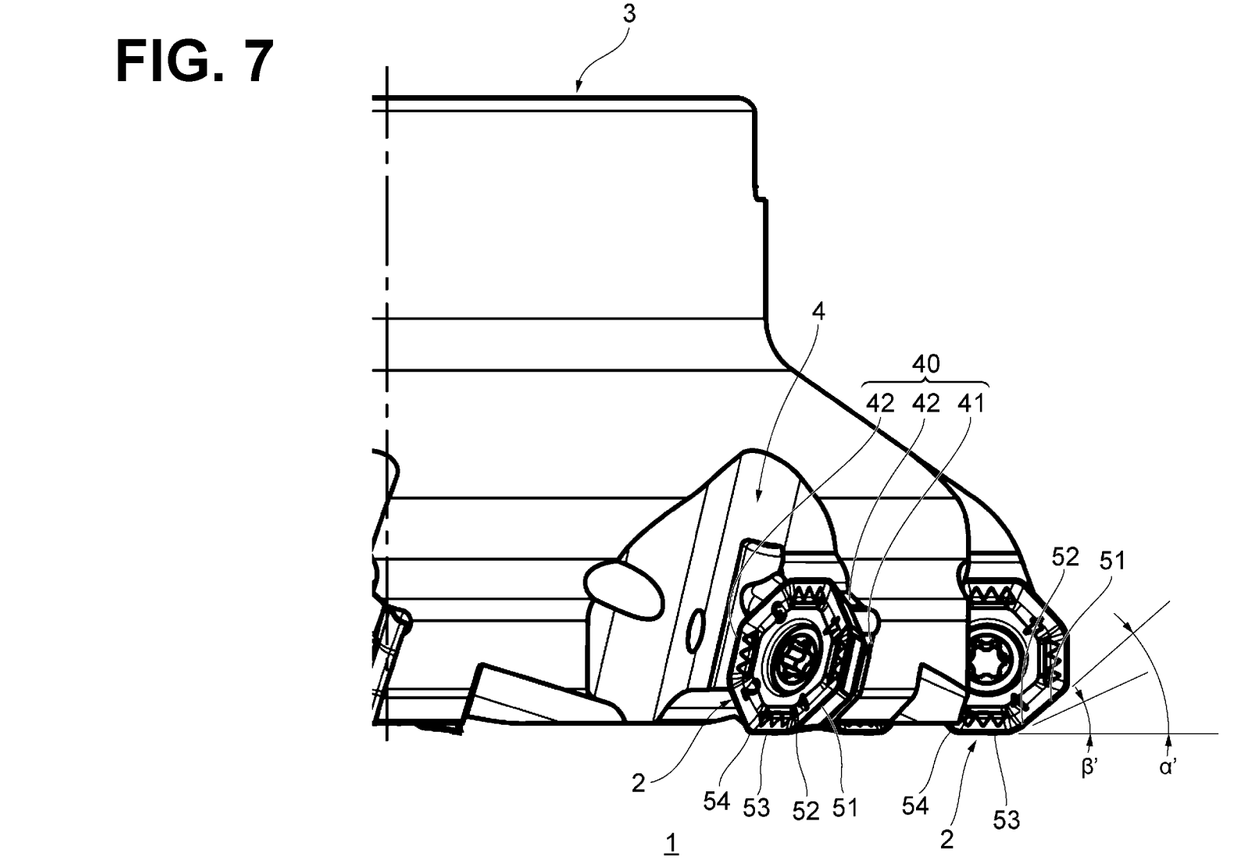
FIG. 7 is a diagram showing cutting angles of a major cutting edge and a deburring cutting edge in a state in which they are mounted on the rotating tool.

FIG. 7 is a diagram showing cutting angles α' and β' of the major cutting edge 51 and the deburring cutting edge 52 when mounted on the rotating tool 1. As described above, the intersecting angle β between the wiper cutting edge 53 and the deburring cutting edge 52 is smaller than the intersecting angle α between the wiper cutting edge 53 and the major cutting edge 51. For this reason, as shown in FIG. 7, the cutting angle β' of the deburring cutting edge 52 is smaller than the cutting angle α' of the major cutting edge 51. When the cutting angle β' is smaller, a height of a burr generated on an outer edge of work material can be reduced.

Since the cutting insert 2 according to a first embodiment of the present invention is configured as described above, the rotating tool 1 including the cutting insert 2 has sufficient space for the cutting edges even when it is a multi-corner cutting insert 2, and thus a plurality of types of cutting edges can be combined and mounted on a single cutting insert 2. It is possible to form the major cutting edge 51 and the wiper cutting edge 53 having substantially the same length.

Since the deburring cutting edge 52 having the small cutting angle β' is provided, it is possible to reduce the height of burrs generated on the outer edge of the work material. Since the corner cutting edge 54 rounded with a curvature larger than that of the wiper cutting edge 53 is provided, a corner of a subsequent edge is less likely to be damaged.

However, as the number of the corners A, B, C, . . . increases, distances between the adjacent corners AB, BC, . . . decrease. For example, in a cutting insert having a square shape ABCD, distances between adjacent corners, that is, the lengths of each side AB, BC, CD, and DA are 100% of a diameter of an inscribed circle thereof. In a cutting insert having a regular pentagonal shape ABCDE, distances AB, BC, . . . between adjacent corners are 72.7% of a diameter of an inscribed circle thereof. In a cutting insert having a regular hexagonal shape ABCDEF, distances AB, BC, . . . between adjacent corners are 57.7% of a diameter of an inscribed circle thereof.

In a cutting insert having a regular heptagonal shape ABCDEFG, distances AB, BC . . . between adjacent corners are 48.2% of a diameter of an inscribed circle thereof. In a cutting insert having a regular octagonal shape ABCDEFGH, distances AB, BC . . . between adjacent corners are 41.4% of a diameter of an inscribed circle thereof. In a cutting insert having a regular nonagonal shape ABCDEFGHI, distances AB, BC, . . . between adjacent corners are 36.4% of a diameter of an inscribed circle thereof. In a cutting insert having a regular decagonal shape ABCDEFGHIJ, distances AB, BC, . . . between adjacent corners are 32.5% of a diameter of an inscribed circle thereof.

According to one embodiment of the present invention, even if the distances AB, BC, . . . between adjacent corners are small, a plurality of types of cutting edges can be mounted on a single cutting insert, and thus the distances AB, BC, . . . between the corners can be 60% or less of the diameter of the inscribed circle. In other words, the cutting insert 2 of the present invention may have a regular polygonal shape including a regular hexagonal or more. The present invention is suitable for a regular hexagonal to regular decagonal cutting insert 2 which has excellent economical efficiency.

The cutting insert 2 of one embodiment of the present invention is a wiper insert for finishing. In the wiper insert, minute chips are generated from the wiper cutting edge 53. Such chips easily flow between the flank and the finished surface. In one embodiment of the present invention, the second side surface 72 includes the lower step surface 72B that is one step lower than the upper step surface 72A, and thus a large space can be secured between the second side surface 72 and the finished surface. This can improve discharge properties with respect to minute chips. On the third side surface 73, which is recessed further than the second side surface 72, a larger space between the flank and the finished surface can be secured.

The embodiments described above are for facilitating understanding of the present invention and are not for limiting construction of the present invention. Each element included in the embodiment and its arrangement, material, conditions, shape, size and the like are not limited to the exemplified ones and can be modified as appropriate. Further, the configurations shown in different embodiments can be partially replaced or combined.

What is claimed is:

1. A cutting insert comprising: an upper surface; a lower surface on an opposite side to the upper surface; and a circumferential side surface connecting the upper surface and the lower surface to each other, wherein
 a ridgeline at which the upper surface and the circumferential side surface intersect each other includes major cutting edges and wiper cutting edges which are alternately disposed one by one, and corners each disposed between each of the major cutting edges and each of the wiper cutting edges,
 only one of the major cutting edges and the wiper cutting edges is disposed between adjacent corners,
 the wiper cutting edges are positioned farther from the central axis of the cutting insert than the major cutting edges are,
 the cutting insert is a regular polygon having six or more sides,
 a first respective corner of the corners that is positioned at one end of a respective wiper cutting edge of the wiper cutting edges is formed at a deburring cutting edge that intersects the respective wiper cutting edge at an angle smaller than an angle formed by a respective major cutting edge of the major cutting edges and the respective wiper cutting edge, and
 a second respective corner of the corners that is positioned at another end of the respective wiper cutting edge is formed at a corner cutting edge having a curvature larger than that of the respective wiper cutting edge.

2. The cutting insert according to claim 1, wherein
 the circumferential side surface includes first side surfaces facing the major cutting edges respectively and second side surfaces facing the wiper cutting edges respectively,
 each of the second side surfaces includes an upper step surface which is inclined to be nearer to a central axis of the cutting insert with increasing proximity to the lower surface and which is continuous with the first side surface without a step between the upper step surface and the first side surface, and a lower step surface which has a step between the lower step surface and the first side surface.

* * * * *